United States Patent [19]

Bourgeois

[11] 4,202,441
[45] May 13, 1980

[54] MODULAR COMPARTMENTALIZED CONVEYOR BELT SYSTEM

[76] Inventor: Ronald D. Bourgeois, 38 Ellison Park, Waltham, Mass. 02154

[21] Appl. No.: 948,153

[22] Filed: Oct. 3, 1978

[51] Int. Cl.² .................... B65G 17/00; B65G 17/24
[52] U.S. Cl. ............................. 198/779; 198/698; 198/851
[58] Field of Search .............. 198/779, 850-853, 198/844, 845, 698, 459, 820

[56] References Cited

U.S. PATENT DOCUMENTS 3,174,617 3/1965 Hoffsinger .................. 198/851

FOREIGN PATENT DOCUMENTS 2516085 10/1976 Fed. Rep. of Germany ........... 198/779
165032 8/1922 United Kingdom .................... 198/851

Primary Examiner—Robert B. Reeves
Assistant Examiner—Douglas D. Watts

Attorney, Agent, or Firm—Joseph S. Iandiorio

[57] ABSTRACT

A modular compartmentalized conveyor belt system including a plurality of spaced roller bearing pins; a plurality of rollers mounted on the pins; first and second spaced sets of raised link members, each set arranged in first and second rows for coupling adjacent pairs of pins, the link members in each row disposed in close overlapping relationship with those in the other row, each of the link members including two horizontally spaced holes for receiving adjacent pins and at least one hole vertically spaced from the horizontally spaced holes for receiving a flight pin; each of the links in each of the rows meeting with adjacent link members in its row approximately midway of the link member in the other row, and each of the link members having at each edge a flight pin recess which cooperates with that of an adjacent link member in the same row for accommodating a flight pin received in a vertical spaced hole in a link member of the other row.

3 Claims, 5 Drawing Figures

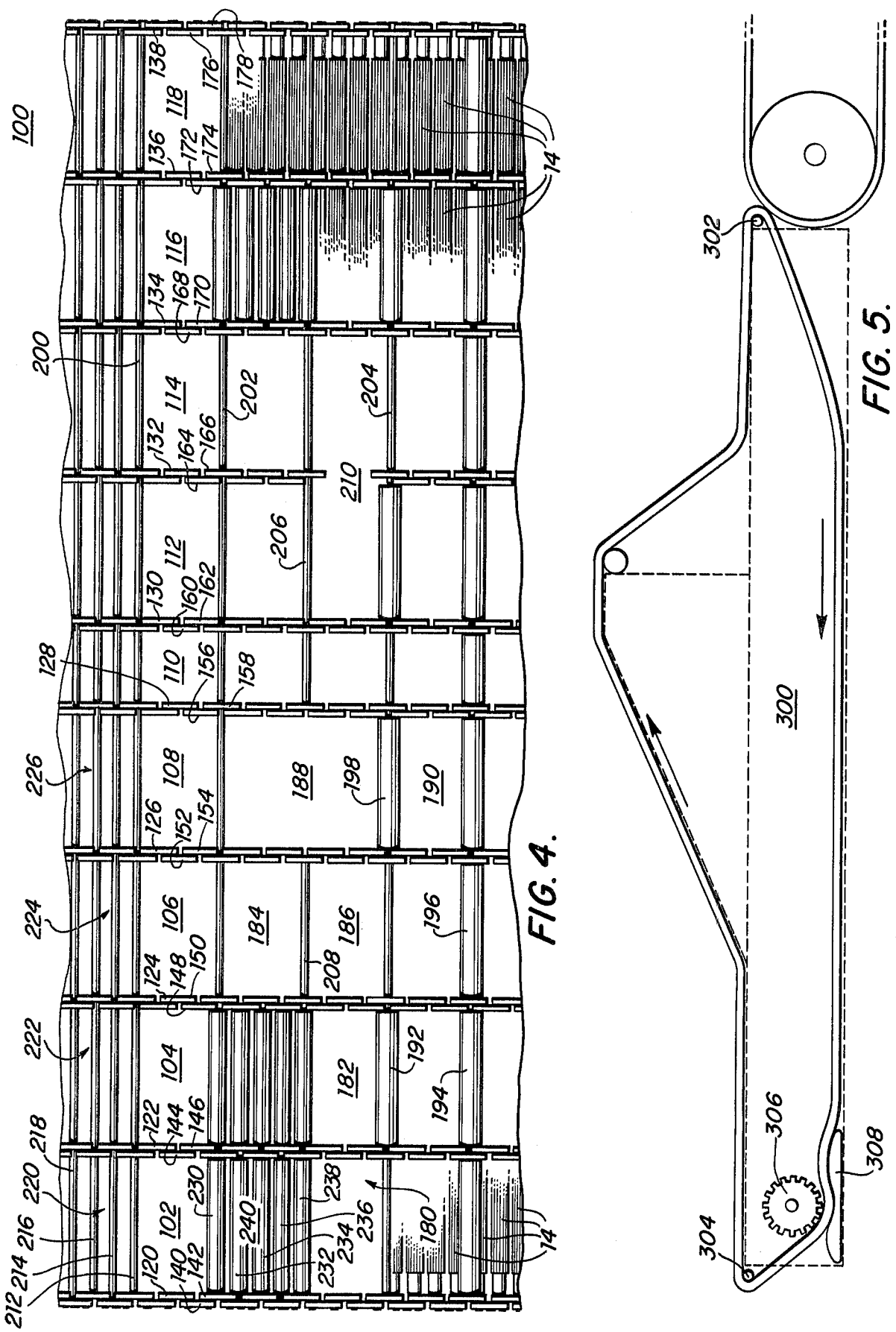

MODULAR COMPARTMENTALIZED CONVEYOR BELT SYSTEM

FIELD OF INVENTION

This invention relates to a modular compartmentalized conveyor belt system.

BACKGROUND OF INVENTION

In conventional compartmentalized articulate conveyor belts, each compartment is associated with an articulate segment which defines the length and height as well as the width of the compartment. As a result the size of the compartments are fixed by the spacing of the articulate member. Conversely, the spacing of the articulate members is set by the required compartment size; a reasonably large compartment thus requires a large space between articulate members which in turn requires large end wheels that restrict the use of the conveyor in close proximity with other equipment. The size of the compartments once set with respect to the articulate members is permanent and cannot be varied to accommodate different types of goods or different arrangements of the goods in multi-channel systems.

SUMMARY OF INVENTION

It is therefore an object of this invention to provide a simple, extremely versatile articulate compartmentalized conveyor belt system in which the size of the compartments and spacing of the articulate members are virtually independent of each other.

It is a further object of this invention to provide such a system in which the length and height of the compartments may be individually varied.

It is a further object of this invention to provide such a system in which any compartment may be closed to prevent loading of goods.

This invention results from the realization that a completely modular compartmentalized conveyor belt system can be achieved using sets of raised link members in overlapping relationship in two rows for linking articulate members and mounting flight pins which segment and/or overlay compartments.

The invention features a modular compartmentalized conveyor belt system which includes a plurality of spaced roller bearing pins and a plurality of rollers mounted on those pins. There are first and second spaced sets of raised link members; each set is arranged in first and second rows for coupling adjacent pairs of pins. The link members in each row are disposed in close overlapping relationship with those in the other row. Each of the link members includes two horizontally spaced holes for receiving adjacent pins and at least one hole vertically spaced from the horizontally spaced holes for receiving a flight pin. Each of the links in each of the rows meets with adjacent link members in its row approximately midway of a link member in the other row, and each of the link members has at each edge a flight pin recess which cooperates with that of an adjacent link member in the same row for accommodating a flight pin received in a vertical spaced hole in a link member of the other row.

Each link member may include a plurality of vertical holes in flight pin recesses. In addition, the modular compartmentalized conveyor belt system may be a multi-channel system in which there are a plurality of spaced sets of raised link members and the space between each set defines a channel for conveying goods.

DISCLOSURE OF PREFERRED EMBODIMENT

Other objects, features and advantages will occur from the following description of a preferred embodiment and the accompanying drawings, in which:

FIG. 4 is a top plan view of a multi-channel modular compartmentalized conveyor belt system according to this invention; and FIG. 5 is a side elevational view showing a conveyor belt system according to this invention installed on a conveyor mechanism.

Figure 1:
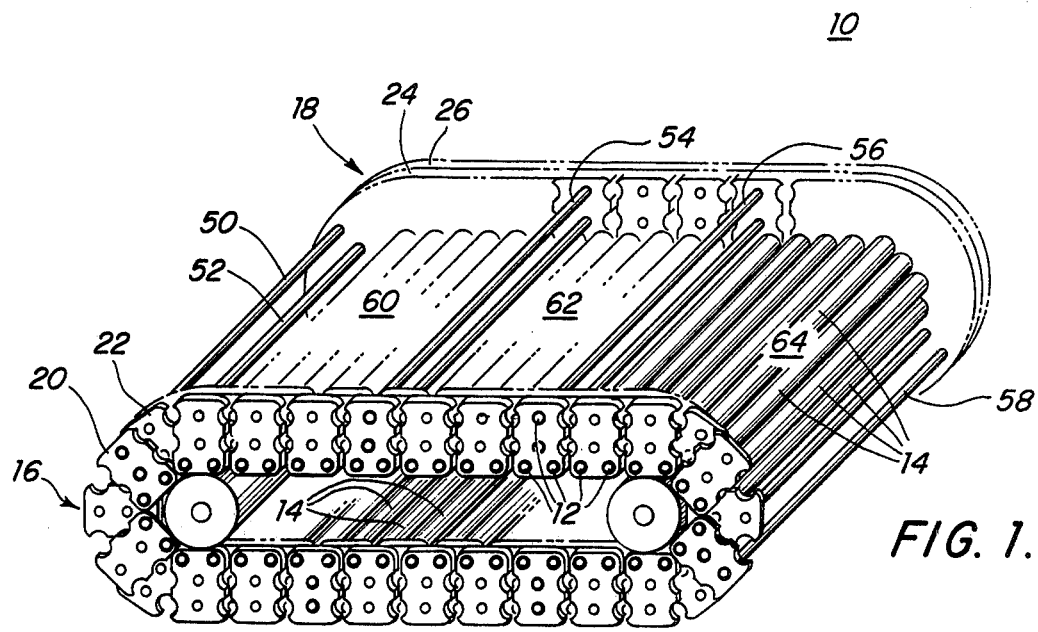
FIG. 1 is an axonometric diagram of a modular compartmentalized conveyor belt system according to this invention.
Figure 2:
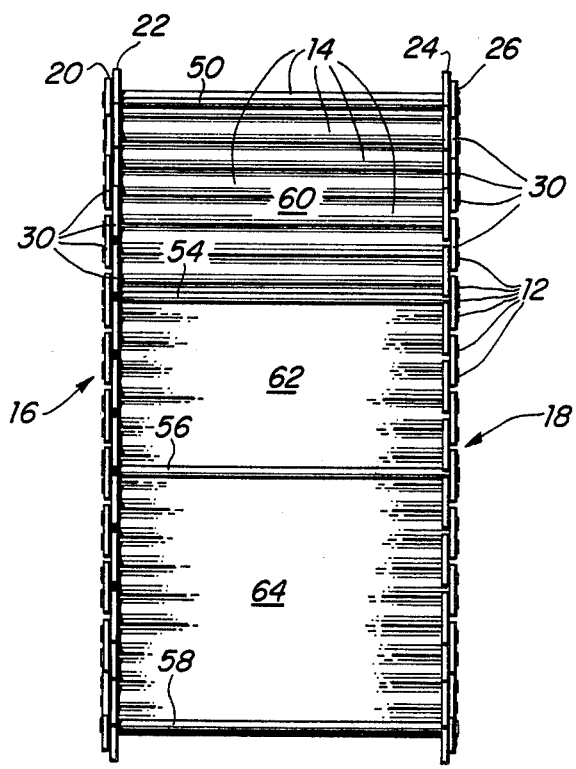
FIG. 2 is a top plan view of the system of FIG. 1.

There is shown in FIG. 1 a modular compartmentalized conveyor belt system 10 including a plurality of spaced roller bearing pins 12 on which are mounted a plurality of rollers 14. There are two sets 16, 18 of raised link members, each set including first and second rows 20, 22, 24, and 26, respectively. Each row 20, 22, 24, 26, FIG. 2, is composed of raised link members contiguously aligned, and each row is arranged closely adjacent the other row in its set so that each raised link member 30 in each row overlaps the junction of two raised link members in the other row in the set. In this manner the sets 16, 18 at the side of the conveyor belt continually maintain a closed wall as the conveyor moves through its path around end wheels as well as along straight runs.

Figure 3:
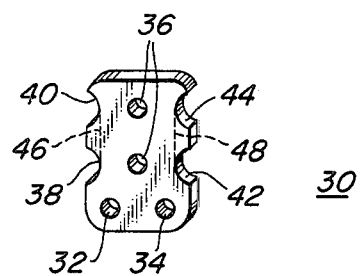
FIG. 3 is an axonometric view of a single raised link member.

Each raised link member 30, FIG. 3, includes a pair of horizontally spaced holes 32, 34, which couple adjacent pairs of pins 12 and define the distance between those articulating members of the belt. In addition, each link 30 includes one or more vertically spaced holes 36 which accommodate flight pins that serve to divide the conveyor into a number of compartments. One or more recesses 38, 40, 42, 44, are provided on either side of link 30 to accommodate flight pins received in holes 36 in other rows. The function of recesses 38 and 40 and 42 and 44 may be served as well by a larger recess which includes both, as indicated by dashed lines 46 and 48.

Flight pins 50, 52, 54, 56 and 58, mounted in holes 36 in links 30, create compartments 60, 62, and 64, which may be made of various lengths in accordance with the modular construction afforded by links 30; the lengths of the compartments are independent of the spacing between pins 12 and rollers 14. Further, even though larger compartment sizes may be chosen, the spacing between the articulate members, the roller bearing pins, and rollers, may be kept small to facilitate very small radius end wheels, which is desirable for close transfer conveyance applications.

Although thus far the invention has been disclosed as a single channel conveyor belt system with using one or two simple flight pins to form compartments, this is not a necessary limitation of the invention.

In FIG. 4 there is shown a multi-channel conveyor belt system 100 including a number of channels 102, 104, 106, 108, 110, 112, 114, 116, and 118, formed by sets 120, 122, 124, 126, 128, 130, 132, 134, 136, and 138 of raised links 30 arranged in pairs of rows 140, 142; 144, 146; 148, 150; 152, 154; 156, 158; 160, 162; 164, 166; 168, 170; 172, 174; and 176, 178, respectively.

The channels may be all of the same size or of different sizes, as indicated by the narrower dimension of channel 110. Flight pins which are used to divide the belt into compartments such as compartments 180, 182, 184, 186, 188, and 190, for example, may be employed bare or may be covered with rollers 192, 194, 196, 198, similar to rollers 14. Flight pins typically extend from side to side of the conveyor belt as indicated by flight pins 200, 202, and 204; however, this is not necessary. For example, flight pins 206 and 208 are shortened in order to produce an enlarged compartment 188 which is larger than any of the other compartments. In addition, a number of raised links may be omitted in order to enlarge the compartment in the lateral direction as indicated by compartment 210. A compartment may be completely closed off by using a number of flight pins such as 212, 214, 216, and 218, which form an effective cover and which are carried in the uppermost hole 36 of the vertical holes and effectively form a roof over the compartment to prevent goods from being loaded into those compartments. These flight pins may be bare, as shown with respect to compartments 220, 222, 224, and 226; or they may contain rollers 230, 232, 234, 236, 238, as in compartment 240, to more completely close the compartment. In this manner, any pattern of conveyed goods may be presented by the conveyor belt in order to accommodate various machines that are to receive the goods for further processing from one or more of the channels. The use of one or more flight pins with or without rollers in conjunction with links 30 at any point along the rows results in a system which is wholly modular in the selection of the size (width, length, height) and location of compartments and in which the compartments' size and location is independent of the spacing between the rollers and roller bearing pins or other articulate members.

Typically, such conveyor belt systems may be advantageously used on conveyor mechanisms 300, FIG. 5, which include extremely small end wheels 302, 304, to permit close positioning of the conveyor with other conveyors and equipment with which the goods are to be exchanged. Such conveyors are easily driven by conventional pressure block drive mechanism 308 and sprocket 306, which may directly drive the rollers mounted on roller bearing pins.

Other embodiments will occur to those skilled in the art and are within the following claims:

What is claimed is:

1. A modular compartmentalized conveyor belt system comprising:
   a plurality of spaced roller bearing pins;
   a plurality of rollers mounted on said pins;
   first and second spaced sets of raised link members, each said set arranged in first and second rows for coupling adjacent pairs of said pins, said link members in each row disposed in close overlapping relationship with those in the other row; each of said link members including two horizontally spaced holes for receiving adjacent pins and at least one hole vertically spaced from said horizontally spaced holes for receiving a flight pin; each of said links in each of said rows meeting with adjacent link members in its row approximately midway of a link member in the other row and each of said link members having at each edge a flight pin recess which cooperates with that of an adjacent link member in the same row for accommodating a flight pin received in a vertical spaced hole in a link member of the other row.

2. The system of claim 1 in which said link members include a plurality of said vertical holes and cooperating flight pin recesses.

3. A multi-channel modular compartmentalized conveyor belt system comprising:
   a plurality of spaced roller bearing pins;
   a plurality of rollers mounted on said pins;
   a plurality of spaced sets of raised link members, the space between each set defining a channel, each said set arranged in rows for coupling adjacent pairs of said pins, said link members in each row disposed in close overlapping relationship with those in the other row; each of said link members including two horizontally spaced holes for receiving adjacent pins and at least one hole vertically spaced from said horizontally spaced holes for receiving a flight pin; each of said links in each of said rows meeting with adjacent link members in its row approximately midway of a link member in the other row and each of said link members having at each edge a flight pin recess which cooperates with that of an adjacent link member in the same row for accommodating a flight pin received in a vertical spaced hole in a link member of the other row.

* * * * *